US007884850B2

(12) United States Patent
Kondoh

(10) Patent No.: US 7,884,850 B2
(45) Date of Patent: Feb. 8, 2011

(54) IMAGE FORMING APPARATUS

(75) Inventor: Yoshinao Kondoh, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 335 days.

(21) Appl. No.: 12/204,246

(22) Filed: Sep. 4, 2008

(65) Prior Publication Data

US 2009/0212831 A1 Aug. 27, 2009

(30) Foreign Application Priority Data

Feb. 22, 2008 (JP) ............................ 2008-042014

(51) Int. Cl.
*H04N 5/225* (2006.01)
*B41J 29/38* (2006.01)
*B41J 2/045* (2006.01)

(52) U.S. Cl. .......................... 348/207.2; 347/9; 347/68

(58) Field of Classification Search ............. 348/207.2; 347/27, 68, 10, 44, 72, 5, 9; 358/1.8
See application file for complete search history.

(56) References Cited

U.S. PATENT DOCUMENTS 6,338,537 B1 * 1/2002 Nou .............................. 347/9
6,948,791 B2 * 9/2005 Togashi et al. ................ 347/14
7,244,007 B2 * 7/2007 Ishizaki ......................... 347/5
7,267,416 B2 * 9/2007 Iriguchi ......................... 347/9
7,445,305 B2 * 11/2008 Kondoh ....................... 347/11
7,585,037 B2 * 9/2009 Tabata et al. .................. 347/10
2004/0090553 A1 * 5/2004 Silverbrook ................ 348/375
2008/0186339 A1 * 8/2008 Kondoh ....................... 347/10

FOREIGN PATENT DOCUMENTS

JP 7-137249 5/1995

* cited by examiner

*Primary Examiner*—Nhan T Tran
(74) *Attorney, Agent, or Firm*—Fildes & Outland, P.C.

(57) ABSTRACT

An image forming apparatus including plural capacitive loads, with one terminal of each of the capacitive loads being connected to a common electrode and with each of the capacitive loads being charged/discharged on the basis of image data, and a first and second drive circuits is provided. The first drive circuit includes plural charge/discharge controllers that are individually connected to other terminals of the capacitive loads and individually control the charging and discharging of the capacitive loads and first and second electrical power wires that are connected to the charge/discharge controllers and charge and discharge the capacitive loads via the charge/discharge controllers. The second drive circuit is connected to each of the first and second electrical power wires and adjusts charge resistance and discharge resistance in response to control of the charge/discharge controllers.

10 Claims, 7 Drawing Sheets

IMAGE FORMING APPARATUS

CROSS-REFERENCE TO RELATED APPLICATION

This application is based on and claims priority under 35 USC 119 from Japanese Patent Application No. 2008-042014 filed on Feb. 22, 2008.

BACKGROUND

1. Technical Field

The present invention relates to an image forming apparatus.

2. Related Art

Conventionally, image forming apparatus such as inkjet printers that eject an ink liquid from ejection openings with respect to a recording medium to form an image on the recording medium are known.

In this type of image forming apparatus, electrical power is supplied from a drive circuit to cause piezoelectric elements, for example, to deform and generate a volume change in pressure generation chambers filled with the ink liquid, whereby ink droplets are ejected from the ejection openings that are spatially connected to those pressure generation chambers. The piezoelectric elements are capacitive because they deform in response to the electric charge amount with which they have been charged.

In this type of image forming apparatus, heat is emitted by the drive circuit when electrical power is supplied from the drive circuit to the piezoelectric elements because the ON resistance of the drive circuit and the capacitances of the piezoelectric elements form a CR series circuit.

Particularly in an elongate head where numerous ejection openings are disposed, numerous piezoelectric elements are also disposed, so the heat emission amount becomes large and a large cooling unit becomes necessary. For this reason, in image forming apparatus, even when ejector components and drive circuits can be made compact, the cooling unit cannot be made small unless the heat emission amount changes, so it has been difficult to make the head compact.

Therefore, there is proposed a technology that makes it possible to make the head compact by moving some of the heat sources to the exterior of the head to disperse heat.

However, in a drive circuit in this technology, since one electrode of each of the piezoelectric elements is used as a common electrode, when the timings of charging and discharging of the piezoelectric elements overlap, a short occurs inside the drive circuit, and therefore it is necessary to ensure that the timings of charging and discharging do not overlap.

SUMMARY

One aspect of the present invention is an image forming apparatus including: plural capacitive loads, with one terminal of each of the capacitive loads being connected to a common electrode and with each of the capacitive loads being charged/discharged on the basis of image data; a first drive circuit that includes plural charge/discharge controllers that are individually connected to other terminals of the capacitive loads and individually control the charging and discharging of the capacitive loads, and first and second electrical power wires that are connected to the charge/discharge controllers and charge and discharge the capacitive loads via the charge/discharge controllers; and a second drive circuit that is connected to each of the first and second electrical power wires and adjusts charge resistance and discharge resistance in response to control of the charge/discharge controllers.

BRIEF DESCRIPTION OF THE DRAWINGS

Exemplary embodiments of the present invention will be described in detail based on the following figures, wherein.

DETAILED DESCRIPTION

Below, exemplary embodiments will be described in detail with reference to the drawings. It will be noted that, below, a case will be described where the present invention is applied to an inkjet printer (image forming apparatus).

First Exemplary Embodiment

Figure 1:
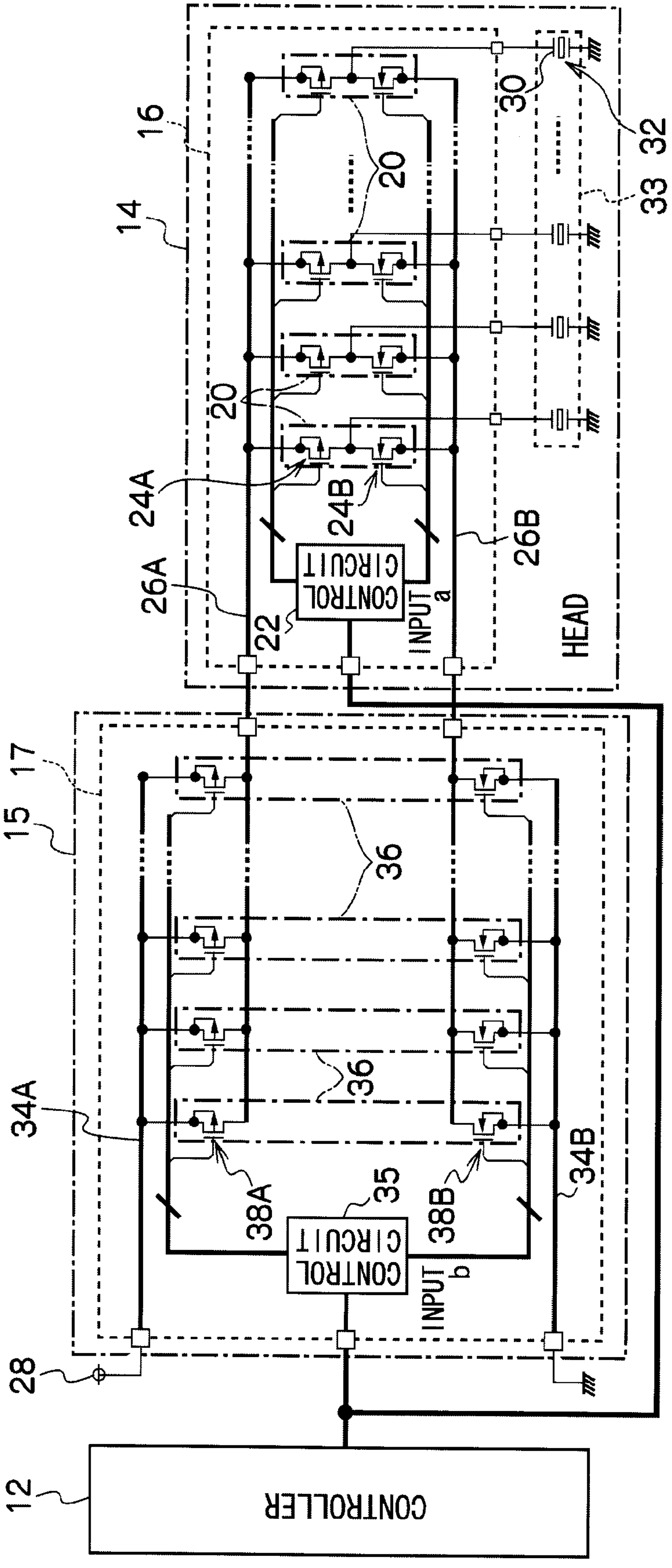
FIG. 1 is a schematic diagram showing the configuration of relevant portions of an inkjet printer pertaining to a first exemplary embodiment.

FIG. 1 is a diagram showing the configuration of relevant portions of an inkjet printer (called a "printer" below) 10 pertaining to the first exemplary embodiment. Here, FIG. 1 mainly shows the configuration of an inkjet recording head peripheral portion excluding a recording paper conveyance system.

As shown in FIG. 1, the printer 10 pertaining to the first exemplary embodiment includes a controller 12 that controls operation of the entire printer 10, an inkjet recording head 14 that ejects ink droplets based on supplied printing data, and a drive circuit 15 for dispersing heat emitted by the inkjet recording head 14.

The inkjet recording head 14 includes plural ejector groups 33, which are configured by plural ejectors 32 that eject ink droplets due to the deformation of individually disposed piezoelectric elements 30 being two-dimensionally arrayed, and drive integrated circuits (ICs) 16, which are disposed in correspondence to each of the ejector groups 33 and control the driving of each of the ejectors 32 of the ejector groups 33.

The drive circuit 15 includes drive ICs 17 that supply electrical power that is supplied from a power source to the drive ICs 16 and whose resistance values change in response to the drive control of the drive ICs 16.

Figure 2:
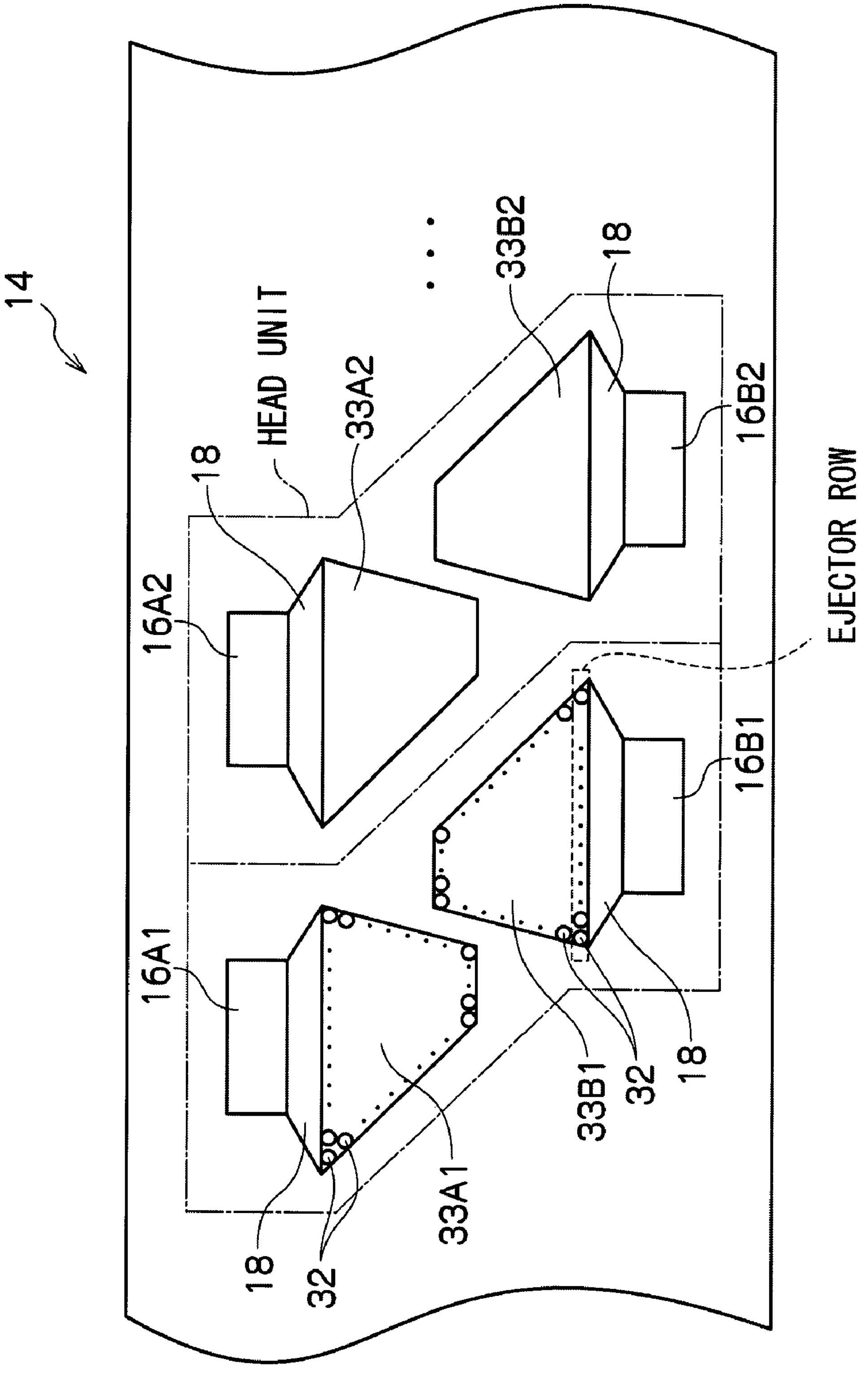
FIG. 2 is a plan diagram showing the general configuration of an inkjet recording head pertaining to the exemplary embodiments.

In FIG. 1, for the sake of convenience, just one of the ejector groups 33, just one of the drive ICs 16 and just one of the drive ICs 17 are shown. However, in the actual inkjet recording head 14 pertaining to the first exemplary embodiment, as shown in FIG. 2, the ejector groups 33 are plurally disposed (in FIG. 2, ejector groups 33A1, 33A2, 33B1 and 33B2) in a predetermined direction, and the drive ICs 16 are plurally disposed (in FIG. 2, drive ICs 16A1, 16A2, 16B1 and 16B2) in correspondence to each of the ejector groups 33. The inkjet recording head 14 is configured as an elongate head that has a width that is substantially equal to the width of the recording paper. Further, in the first exemplary embodiment, the drive ICs 17 are plurally disposed in the drive circuit 15 in correspondence to the plural drive ICs 16.

That is, the printer 10 is configured as an inkjet printer that performs recording across the entire width of the recording paper by ejecting ink droplets from each of the ejectors 32 while conveying just the recording paper with the inkjet recording head 14 being fixed.

Each of the ejectors 32 pertaining to the exemplary embodiment includes a pressure generation chamber that is filled with a colored ink liquid, a diaphragm and an actuator. The diaphragm is spatially connected to the pressure generation chamber, configures part of a wall surface of the pressure generation chamber and an ejection opening that is capable of ejecting ink, and vibrates to thereby cause the pressure generation chamber to expand or contract. The actuator is disposed with the piezoelectric element 30 that causes the diaphragm to vibrate as a result of the piezoelectric element 30 being deformed by a voltage that is applied in response to image data that represents an image to be recorded.

The drive ICs 16 and the drive ICs 17 are connected by plural signal lines to the controller 12, and various types of signals are inputted to the drive ICs 16 and the drive ICs 17 from the controller 12 (these signals will be described in detail later).

Next, the detailed configurations of the drive ICs 16 and the drive ICs 17 pertaining to the exemplary embodiment will be described.

Each of the drive ICs 16 (see FIG. 1) pertaining to the exemplary embodiment includes plural switch circuits 20 that are individually connected to the plural piezoelectric elements 30 and individually control the charging and discharging of the plural piezoelectric elements 30, a control circuit 22 that outputs charge control signals and discharge control signals that control the switching of each of the switch circuits 20, and two electrical power wires 26A and 26B that are connected in parallel to the plural switch circuits 20 and are for supplying electrical power to the plural piezoelectric elements 30 via the plural switch circuits 20.

Each of the drive ICs 17 includes plural switch circuits 36, which connect in parallel the electrical power wires 26A and 26B to a wire 34A to which electrical power is supplied from a power source 28 and a wire 34B that is connected to a ground, and a control circuit 35, which outputs charge control signals and discharge control signals that control the switching of each of the switch circuits 36.

As described below, the circuit configurations of the drive ICs 16 and the drive ICs 17 pertaining to the exemplary embodiment are different at the portions that connect the plural piezoelectric elements 30 to the plural switch circuits 20 and the portions that connect the electrical power wires 26A and 26B to the plural switch circuits 36, and are the same at the other portions. Further, the control circuit 22 and the control circuit 35 have the same circuit configuration.

Electrical power of a predetermined voltage is supplied to the wire 34A from the power source 28, and the voltage level of the wire 34B is a ground level.

Each of the switch circuits 36 of the drive ICs 17 includes a P-channel MOSFET (called "PMOS" below) 38A and an N-channel MOSFET (called "NMOS" below) 38B. The source of each of the PMOS 3 8A is connected to the wire 34A, and the drain of each of the PMOS 38A is connected to the electrical power wire 26A. The source of each of the NMOS 38B is connected to the wire 34B, and the drain of the each of the NMOS 38B is connected to the electrical power wire 26B. Moreover, each of the gates of each of the PMOS 38A and the NMOS 38B is connected to the control circuit 35. The charge control signals are inputted from the control circuit 35 to the gates of the PMOS 38A, and the discharge control signals are inputted from the control circuit 35 to the gates of the NMOS 38B.

Each of the switch circuits 20 of the drive ICs 16 is configured as an inverter circuit in which PMOS 24A and NMOS 24B are connected in series. The source of each of the PMOS 24A is connected to the electrical power wire 26A, and the source of each of the NMOS 24B is connected to the electrical power wire 26B. The drain of each of the PMOS 24A and the drain of each of the NMOS 24B are connected to each other and are connected to the piezoelectric elements 30. Moreover, each of the gates of the PMOS 24A and the NMOS 24B is connected to the control circuit 22. The charge control signals are inputted from the control circuit 22 to the gates of the PMOS 24A, and the discharge control signals are inputted from the control circuit 22 to the gates of the NMOS 24B.

In FIG. 1, for the sake of convenience, the wires that connect the control circuit 35 to the PMOS 38A and the NMOS 38B and the wires that connect the control circuit 22 to the PMOS 24A and the NMOS 24B are respectively shown as being one wire each. However, in actuality, the PMOS 38A and the NMOS 38B are respectively connected to the control circuit 35 by bus lines, and the PMOS 24A and the NMOS 24B are respectively connected to the control circuit 22 by bus lines.

Next, the circuit configurations of the control circuits 22 and 35 pertaining to the exemplary embodiment will be described. As mentioned above, since the control circuits 22 and 35 have the same circuit configuration, only the circuit configuration of the control circuit 22 will be described below.

Figure 3:
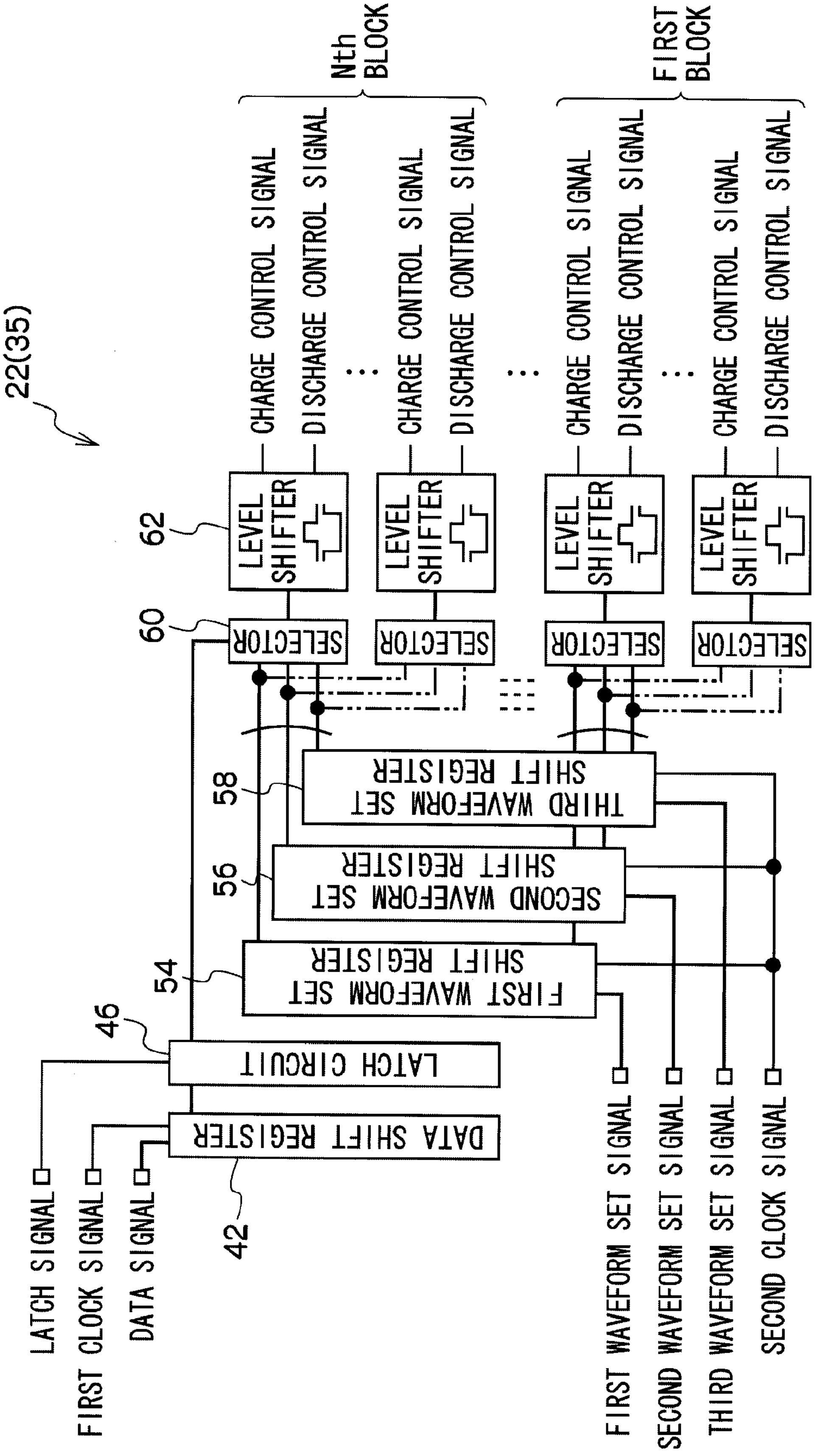
FIG. 3 is a plan diagram showing the detailed configuration of a control circuit pertaining to the exemplary embodiments.

FIG. 3 shows the configuration of the control circuit 22 pertaining to the exemplary embodiment.

As shown in FIG. 3, the control circuit 22 pertaining to the exemplary embodiment includes a data shift register 42, a latch circuit 46, a first waveform set shift register 54, a second waveform set shift register 56, a third waveform set shift register 58, a selector 60, and a level shifter 62.

In the control circuit 22, the data shift register 42 is disposed for each of the control circuits 22. The latch circuit 46, the selector 60 and the level shifter 62 are respectively disposed for each of the ejectors 32. The first waveform set shift register 54, the second waveform set shift register 56 and the third waveform set shift register 58 are disposed for each block of the ejectors 32 of each of the ejector groups 33 that are caused to eject liquid (ink) droplets at the same time (simultaneously).

The controller 12 is connected to all of the drive ICs 16 that are disposed in the inkjet recording head 14 by a common first clock signal line, a common latch signal line, a common first waveform set signal line, a common second waveform set signal line, a common third waveform set signal line and a common second clock signal line. Further, the controller 12 is connected to each of the drive ICs 16 respectively by data signal lines.

The first clock signal line and the data signal line are connected to the data shift register 42. The latch signal line is connected to the latch circuit 46. Moreover, the first waveform set signal line is connected to the first waveform set shift register 54, the second waveform set signal line is connected to the second waveform set shift register 56, and the third waveform set signal line is connected to the third waveform set shift register 58. The second clock signal line is connected in parallel to the first waveform set shift register 54, the second waveform set shift register 56 and the third waveform set shift register 58.

Consequently, a first clock signal and printing data outputted from the controller 12 are inputted to the data shift register 42. Further, a latch signal outputted from the controller 12 is inputted to the latch circuit 46.

A first waveform set signal outputted from the controller 12 is inputted to the first waveform set shift register 54, a second waveform set signal outputted from the controller 12 is inputted to the second waveform set shift register 56, and a third waveform set signal outputted from the controller 12 is inputted to the third waveform set shift register 58. Moreover, a second clock signal outputted from the controller 12 is respectively inputted to the first waveform set shift register 54, the second waveform set shift register 56 and the third waveform set shift register 58.

The aforementioned printing data is data that designate which waveform signal of the first waveform set signal, the second waveform set signal and the third waveform set signal is to be used in order to cause liquid droplets to be ejected. In the exemplary embodiment, 3-bit serial data is used as the printing data, where, for example, "001" indicates that the first waveform set signal is to be used as the waveform signal, "010" indicates that the second waveform set signal is to be used as the waveform signal and "100" indicates that the third waveform set signal is to be used as the waveform signal.

In the exemplary embodiment, the printing data is inputted to the data shift register 42 continuously in correspondence to the number of the ejectors 32 that are included in the corresponding ejector groups 33.

The data shift register 42 temporarily stores the printing data that is serial data that is inputted.

When the controller 12 instructs output of the data that has been stored in the data shift register 42, the controller 12 outputs an instruction pulse of a predetermined pattern to the data signal line without outputting the first clock signal to the first clock signal line.

When output of the data is instructed, the data shift register 42 converts the stored printing data that is serial data into parallel data for each of the ejectors 32 and outputs the parallel data to the latch circuit 46 that is disposed in correspondence to each of the ejectors 32.

It will be noted that, below, only the latch circuit 46, the selector 60 and the level shifter 62 that are disposed for one of the ejectors 32 will be described, but the same is also true of the other ejectors 32.

The controller 12 selectively outputs signals whose voltage levels are a high level (H) and a low level (L) as the latch signal to the latch signal line.

When a high level latch signal is inputted to the latch signal line, the latch circuit 46 latches (self-holds) the parallel data that has been outputted from the data shift register 42.

The first waveform set shift register 54, the second waveform set shift register 56 and the third waveform set shift register 58 temporarily store the inputted waveform signal. Further, the first waveform set shift register 54, the second waveform set shift register 56 and the third waveform set shift register 58 respectively output, for each block of the ejectors 32 that are to eject ink droplets simultaneously, the stored data with a delay of a predetermined time period based on the inputted second clock signal. That is, when the block of the ejectors 32 that are to eject ink droplets simultaneously is, for example, the ejector row shown in FIG. 2, the first waveform set shift register 54, the second waveform set shift register 56 and the third waveform set shift register 58 output the stored waveform signal at timings corresponding to positions with respect to an orthogonal direction with respect to the ejector row of the inkjet recording head 14.

The first waveform set signal, the second waveform set signal and the third waveform set signal are inputted, as signals to be selected, to the selector 60 from the first waveform set shift register 54, the second waveform set shift register 56 and the third waveform set shift register 58. Further, the parallel data that has been latched by the latch circuit 46 is inputted to a selector terminal of the selector 60. Consequently, the selector 60 selects and outputs the waveform signal which is designated by the parallel data from the first waveform set signal, the second waveform set signal and the third waveform set signal.

An output terminal of the waveform signal of the selector 60 is connected to the level shifter 62. The waveform signal outputted from the selector 60 is inputted to the level shifter 62.

When the waveform signal is inputted to the level shifter 62, the level shifter 62 respectively outputs the charge control signal, which is obtained by converting the inputted waveform signal to a predetermined voltage level, and the discharge control signal, which is obtained by inverting the waveform of the inputted waveform signal and converting the inverted waveform signal to the predetermined voltage level. Thus, the charge control signal has a waveform of the same shape as that of the waveform signal selected by the selector 60, and the discharge control signal has a waveform of the same shape as that of the waveform signal selected by the selector 60.

The control circuit 22 and the control circuit 35 pertaining to the exemplary embodiment output the charge control signal and the discharge control signal of the same waveform to each of the ejectors 32. The charge control signal outputted from the control circuit 22 is supplied to the gates of the PMOS 24A, and the discharge control signal outputted from the control circuit 22 is supplied to the gates of the NMOS 24B. The charge control signal outputted from the control circuit 35 is supplied to the gates of the PMOS 38A, and the discharge control signal outputted from the control circuit 35 is supplied to the gates of the NMOS 38B.

In the printer 10 pertaining to the exemplary embodiment, there are three types of droplet amounts of the ink droplets that are ejected by the driving of the piezoelectric elements 30: "large droplets", "middle-sized droplets" and "small droplets". The controller 12 generates the first waveform set signal, the second waveform set signal and the third waveform set signal as waveform signals that respectively cause these three types of ink droplets to be ejected.

Figure 4:
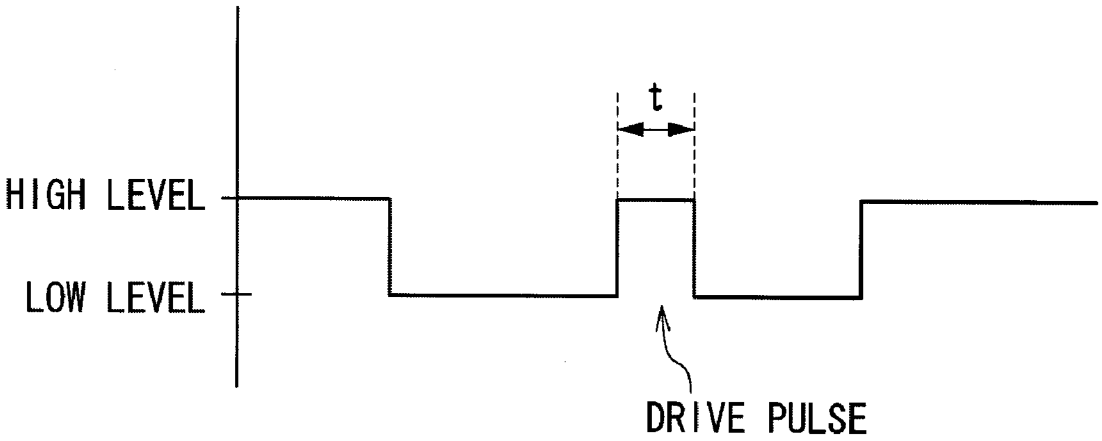
FIG. 4 is a waveform diagram showing an example of a waveform signal that is generated by a controller.

FIG. 4 shows an example of a waveform signal that is generated by the controller 12.

In the printer 10 pertaining to the exemplary embodiment, the controller 12 changes a pulse width t of a drive pulse that is included in the waveform signal to change the droplet amount of the ink droplets that are ejected from the ejection openings to any of large droplets, middle-sized droplets and small droplets. The first waveform set signal, the second waveform set signal and the third waveform set signal are configured to be signals in which are included drive pulses whose pulse widths t are different.

Figure 5:
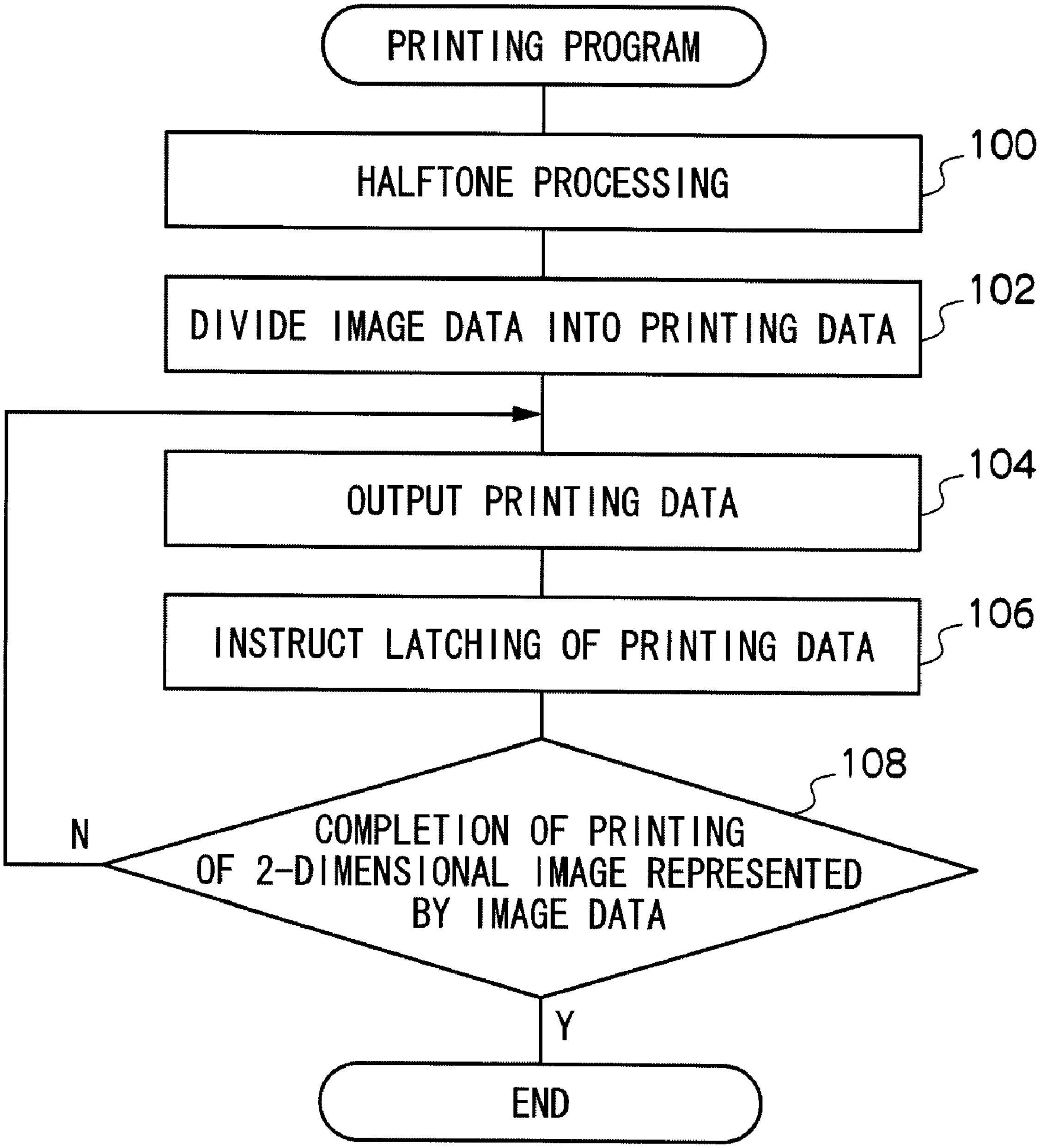
FIG. 5 is a flowchart showing a flow of processing of a printing program pertaining to the first exemplary embodiment.

Next, an operation of the printer 10 pertaining to the present embodiment during printing will be described with reference to FIG. 5. FIG. 5 is a flowchart showing a flow of processing of a printing program that is executed by the controller 12 when image data representing an image to be printed have been inputted from an unillustrated external device. Here, in order to avoid confusion, a case will be described where the printer 10 prints an image for a single page.

In step 100 of FIG. 5, halftone processing, such as dithering and error diffusion, for example, is performed with respect to the inputted image data to convert the image data from image data of a relatively high number of tones such as 256 tones to image data of a number of tones recordable by the inkjet recording head 14.

In the next step 102, the two-dimensional image represented by the converted image data are divided into printing data corresponding to a elongated rectangular image to be printed at one time by the inkjet recording head 14, and the printing data corresponding to the elongated rectangular image are further divided into printing data to be printed by each of the ejector groups 33 that are disposed in the inkjet recording head 14.

In step 104, the first clock signal is outputted to the first clock signal line and, in synchronization with the first clock signal, the printing data obtained by dividing the elongated rectangular image to be printed at one time for each of the ejector groups 33 in step 102 are serially outputted to the data signal line connected to the drive ICs 16 corresponding to each of the ejector groups 33. In this step 104, a low level signal is outputted to the latch signal line.

Thus, the inputted printing data are temporarily stored in the data shift register 42.

In the next step 106, the instruction pulse is outputted to the data signal line without the first clock signal being outputted to the first clock signal line. In this step 106, a high level signal is outputted to the latch signal line. Moreover, in this step 106, the second clock signal is outputted to the second clock signal line.

Then, the data shift register 42 converts the stored printing data that are serial data into parallel data and outputs the parallel data to the latch circuit 46 disposed in correspondence to each of the ejectors 32. As a result, the printing data are latched in the latch circuit 46. The latched printing data are held until the printing data are updated with new printing data.

The printing data latched by the latch circuit 46 are outputted to the selector 60.

The first waveform set shift register 54, the second waveform set shift register 56 and the third waveform set shift register 58 respectively output, for the blocks of the ejectors 32 that are to eject ink droplets simultaneously, the stored waveform signal with a delay of a predetermined time period based on the second clock signal inputted via the second clock signal line.

As a result, the selector 60 outputs, to the level shifter 62, the waveform signal which is selected by the printing data from the first waveform set shift register 54, the second waveform set shift register 56 and the third waveform set shift register 58.

The level shifter 62 respectively outputs the charge control signal, which is obtained by converting the inputted waveform signal to a predetermined voltage level, and the discharge control signal, which is obtained by inverting the waveform of the inputted waveform signal and converting the inverted waveform signal to the predetermined voltage level.

The control circuit 22 and the control circuit 35 pertaining to the exemplary embodiment output the charge control signal and the discharge control signal of the same waveform for each of the ejectors 32.

The charge control signal outputted from the control circuit 22 is supplied to the gates of the PMOS 24A, and the discharge control signal outputted from the control circuit 22 is supplied to the gates of the NMOS 24B.

Each of the PMOS 24A and each of the NMOS 24B is switched ON and OFF in response to the supplied charge control signal and the supplied discharge control signal. Thus, charging and discharging of each of the piezoelectric elements 30 are performed, and each of the piezoelectric elements 30 deforms in response to the charge amount with which each of the piezoelectric elements 30 has been charged, whereby liquid droplets are ejected from the ejection openings.

On the other hand, the charge control signal outputted from the control circuit 35 is supplied to the gates of the PMOS 38A, and the discharge control signal outputted from the control circuit 35 is supplied to the gates of the NMOS 38B.

Each of the PMOS 38A and each of the NMOS 38B is switched ON and OFF in response to the supplied charge control signal and the supplied discharge control signal. Thus, each of the PMOS 38A and each of the NMOS 38B that connect in parallel the wire 34B and the electrical power lines 26A and 26B are switched ON and OFF, and therefore, the resistance values of the drive ICs 17 change.

In the next step 108, it is determined whether or not printing of the two-dimensional image represented by the image data has been completed. When the determination is negative, then the printing program returns to step 104, and when the determination is affirmative, then the printing program ends. When the processing of step 104 to step 108 is repeatedly executed, printing data corresponding to an image region to be printed next are used as the processing target printing data.

In this manner, in the printer 10 pertaining to the exemplary embodiment, conceptually, resistors R of a CR series circuit are configured by two series ON resistors on both the charge side and the discharge side, the drive ICs 16 are installed in the inkjet recording head 14 together with the ejector groups 33, and the drive ICs 17 are disposed outside the inkjet recording head 14.

Thus, because some of the resistors R are present outside the inkjet recording head 14, the heat sources can be dispersed and the heat emission amount of the inkjet recording head 14 is reduced.

Further, in both the charge side and the discharge side, the switching ON and OFF of the PMOS 38A and the NMOS 38B of the drive ICs 17 is controlled based on the number of the PMOS 24A and the NMOS 24B of the drive ICs 16 that are switched ON. Thus, even when the number of the ejectors 32 that are ON is different, the time constant of charging/discharging becomes substantially constant and a situation where the edges of the waveforms of the charge control signal and the discharge control signal become dull is controlled, and thereby a drop in liquid droplet ejection characteristics is controlled.

For example, assuming a case where 256 of the ejectors 32 are driven per one drive IC 16 and, at the same time, 32 of the ejectors 32 are charged, 64 of the ejectors 32 are discharged and the remaining 160 ejectors 32 are at rest, then in the drive ICs 17, 32 of the PMOS 38A become switched ON and 64 of the NMOS 38B become switched OFF.

In this manner, by connecting in series the drive ICs 17 to the drive ICs 16, it becomes substantially equivalent to a case where two of the drive ICs 16 are connected in series, and therefore, the time constant of charging/discharging can be maintained to a substantial constant regardless of the number of the piezoelectric element ejectors that are driven. Further, by configuring the individual PMOS and NMOS in the drive ICs 17 to be connected in parallel to the electrical power lines 26A and 26B of the drive ICs 16, terminals can be shared on both the charge side and the discharge side, and it suffices for there to be only one connection wire on both the charge side and the discharge side.

Second Exemplary Embodiment

The configurations of relevant portions of a printer 10 pertaining to a second exemplary embodiment are substantially the same as those of the first exemplary embodiment (see FIG. 1), and only part of the configuration of the drive ICs 17 is different.

Figure 6:
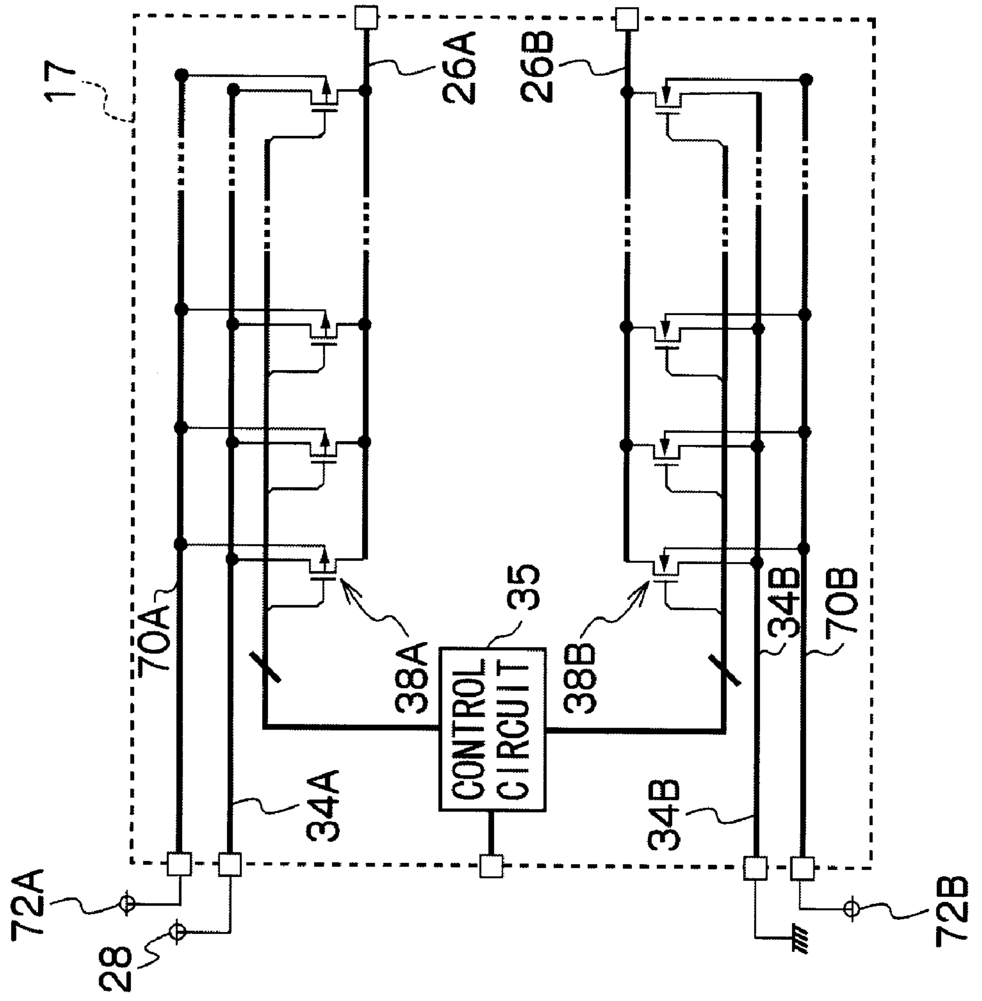
FIG. 6 is a schematic diagram showing the configuration of relevant portions of a drive IC pertaining to a second exemplary embodiment.

FIG. 6 shows the configuration of the drive IC 17 pertaining to the second exemplary embodiment. Identical reference numerals will be given to portions in FIG. 6 that are identical to those in FIG. 1, and description of those identical portions will be omitted.

Each of the drive ICs 17 pertaining to the exemplary embodiment further includes a back gate wire 70A that is connected in parallel to the back gate of each of the PMOS 38A and a back gate wire 70B that is connected in parallel to the back gate of each of the NMOS 38B.

The back gate wire 70A is connected to a power source 72A, and the back gate wire 70B is connected to a power source 72B. The power source 72A and the power source 72B are configured to be capable of changing the voltage levels that they respectively apply to the back gate wires 70A and 70B by control from the controller 12.

The drive ICs 17 pertaining to the exemplary embodiment are connected to the controller 12 by plural signal lines that are separate from the signal lines that connect the controller 12 to the drive ICs 16. The controller 12 outputs the first clock signal, the latch signal, the first waveform set signal, the second waveform set signal, the third waveform set signal and the second clock signal respectively with respect to the drive ICs 17 and the drive ICs 16.

That is, the controller 12 is capable of independently controlling the drive ICs 17 and the drive ICs 16.

Because the total heat emission amount when the liquid droplets are ejected from the inkjet recording head 14 does not change, a configuration that increases the heat emission amount of the drive ICs 17 is necessary in order to reduce the heat emission amount of the inkjet recording head 14.

In order to increase the heat emission amount of the drive ICs 17, it suffices to raise the ON resistances of the drive ICs 17.

In the printer 10 of the exemplary embodiment, there are the following two methods of adjusting the ON resistances of the drive ICs 17.

(1) The number of the PMOS 38A and the number of the NMOS 38B that are switched ON in the drive IC 17 are made smaller than the number of the PMOS 24A and the number of the NMOS 24B that are switched ON in the drive IC 16. For example, the ratio of transistors that are switched ON is such that drive IC 16:drive IC 17=2:1.

That is, the controller 12 performs control the drive ICs 16 and 17 respectively such that the number of transistors that are switched ON in the drive IC 17 becomes ½ the number of transistors that are switched ON in the drive IC 16. It will be noted that a fraction that is less than a decimal point when the number of transistors that are switched ON is halved may be rounded up, rounded down, or rounded off.

In this manner, by reducing the number of transistors that are switched ON in the drive IC 17, the heat emission amount of the inkjet recording head 14 is reduced. Further, even when the number of transistors that are switched ON is reduced to about ½, changes in the time constant of charging/discharging can be kept small, and therefore, it can sufficiently withstand utilization.

(2) The voltage levels that are applied to the back gates via the back gate wires 70A and 70B is changed such that the ON resistances of the PMOS 38A and the NMOS 38B become higher.

In this manner, by raising the ON resistances of the PMOS 38A and the NMOS 38B, the heat emission amount of the inkjet recording head 14 is reduced.

Third Exemplary Embodiment

Figure 7:
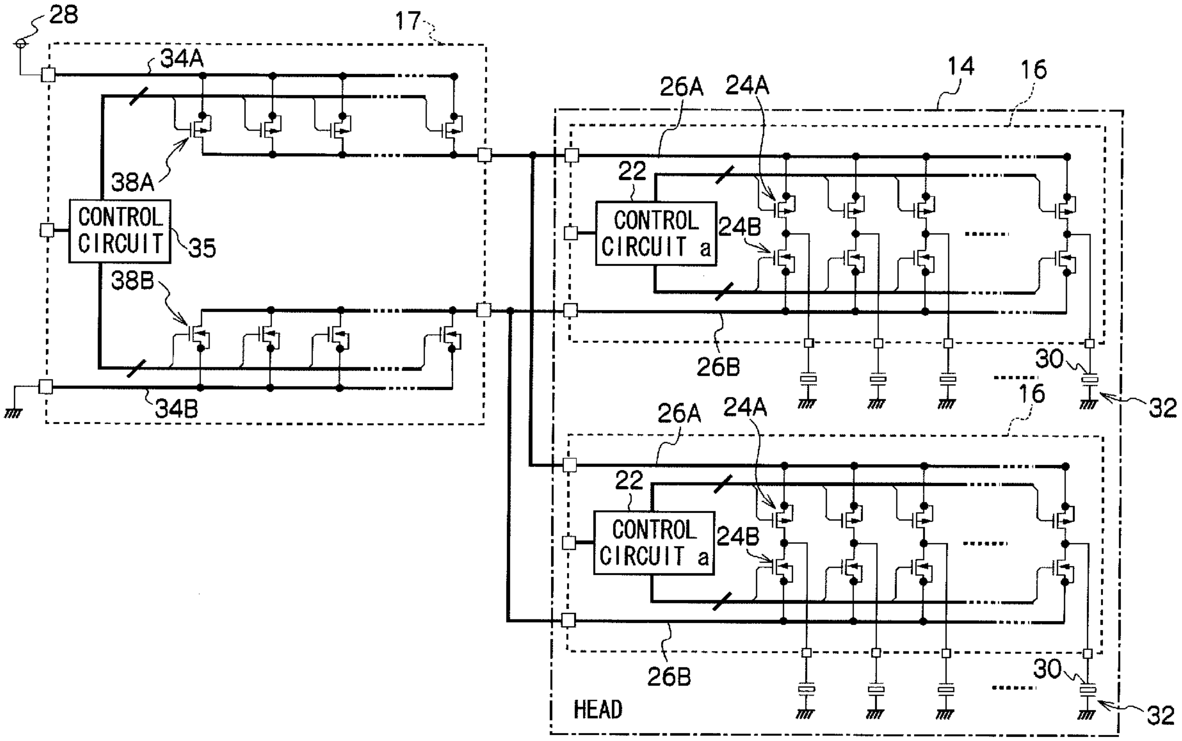
FIG. 7 is a schematic diagram showing the configuration of relevant portions of a drive IC pertaining to a third exemplary embodiment.

A printer 10 pertaining to a third exemplary embodiment is substantially the same as that of the first exemplary embodiment (see FIG. 1). However, as shown in FIG. 7, drive ICs 16 are plurally disposed with respect to one drive IC 17, and the electrical power wires 26A and 26B of the drive ICs 16 are connected in parallel to the drive IC 17. It will be noted that identical reference numerals will be given to portions in FIG. 7 that are identical to those in FIG. 1, and description of those identical portions will be omitted.

As shown in FIG. 7, in the printer 10 pertaining to the third exemplary embodiment, one drive IC 17 is allocated with respect to plural drive ICs 16 (two in the exemplary embodiment).

Further, the drive IC 17 pertaining to the exemplary embodiment is connected to the controller 12 by plural signal lines that are separate from the signal lines that interconnect the drive ICs 16 and the controller 12. The controller 12 outputs the first clock signal, the latch signal, the first waveform set signal, the second waveform set signal, the third waveform set signal and the second clock signal respectively with respect to the drive IC 17 and the drive ICs 16.

That is, the controller 12 is capable of independently controlling the drive IC 17 and the drive ICs 16.

The controller 12 performs control respectively to the drive IC 17 and the drive ICs 16 such that the number of transistors that are switched ON in the drive IC 17 becomes ½ the number of transistors that are switched ON in the drive ICs 16.

For example, the controller 12 performs control such that the number of transistors that are switched ON in the drive IC 17 becomes ½ the number of transistors that become switched ON in the two drive ICs 16 to which that drive IC 17 is connected.

More specifically, the controller 12 determines the number of transistors of the drive ICs 16 that are switched ON simultaneously with respect to a predetermined drive cycle, generates data where ½ the number of those transistors are switched ON, and controls the switching ON and OFF of each transistor of the drive IC 17 based on the generated data. The controller 12 may also use the drive waveform of any one of the waveform signals as a reference drive waveform to control the switching ON and OFF of each transistor of the drive IC 17 in response to the number of transistors of the drive ICs 16 that are switched ON at the same time by the reference drive waveform. This reference drive waveform may be the drive waveform that is supplied the most frequently with respect to each transistor of the drive ICs 16.

In this manner, by reducing the number of transistors that are switched ON in the drive IC 17, the heat emission amount of the inkjet recording head 14 is reduced. Further, the number of drive ICs 17 that are disposed outside the head can be reduced.

In each of the preceding exemplary embodiments, a case has been described where the inkjet recording head 14 is configured by an elongate head whose width is wider than the width of the recording paper and where the recording paper is moved with respect to the fixed elongate head to record an image, but the embodiment of the present invention is not limited to this. For example, the embodiments may also be applied to an inkjet printer that forms an image on the recording paper while causing the inkjet recording head to reciprocally move with respect to the recording paper. In this case, the same effects as those of each of the preceding exemplary embodiments can be also provided.

Further, the configuration of the printer 10 (see FIG. 1), the configuration of the inkjet recording head 14 (see FIG. 2), the configuration of the control circuit 22 (see FIG. 3) and the configurations of the drive ICs 16 and 17 (see FIG. 6 and FIG. 7) described in each of the preceding exemplary embodiments are only examples and are capable of being appropriately modified within a range that does not depart from the gist of the present invention.

The waveform set signals (FIG. 4) described in each of the preceding exemplary embodiments are also only examples and are capable of being appropriately modified within a range that does not depart from the gist of the present invention.

The flow of processing of the printing program (see FIG. 5) described in each of the preceding exemplary embodiments is also only an example and, it goes without saying, is capable of being modified within a range that does not depart from the gist of the present invention.

Further, the printer 10 described in each of the preceding exemplary embodiments is an apparatus that forms an image (including characters) on a recording medium, but the printer 10 of the embodiment of the present invention is not limited to this. That is, the recording medium is not limited to the recording paper, and the liquid that is ejected is not limited to the ink liquid. For example, the embodiments can also be applied to other image forming apparatus, such as pattern forming apparatus that eject liquid droplets onto a sheet-like substrate for pattern formation of semiconductors or liquid crystal displays.

Moreover, in each of the preceding exemplary embodiments, an example has been described where piezoelectric elements are used as capacitive loads, but the embodiment of the present invention is not limited to this. The same effects can be obtained even when, instead of piezoelectric elements, for example, liquid crystal or a static actuator that uses one of opposing electrodes as an elastic body electrode and utilizes displacement of the elastic body electrode resulting from electrostatic force is used.

What is claimed is:

1. An image forming apparatus comprising:

a plurality of capacitive loads, with one terminal of each of the capacitive loads being connected to a common electrode and with each of the capacitive loads being charged/discharged on the basis of image data;

a first drive circuit that comprises a plurality of charge/discharge controllers that are individually connected to other terminals of the capacitive loads and individually control the charging and discharging of the capacitive loads and first and second electrical power wires that are connected to the charge/discharge controllers and charge and discharge the capacitive loads via the charge/discharge controllers; and a second drive circuit that is connected to each of the first and second electrical power wires and adjusts charge resistance and discharge resistance in response to control of the charge/discharge controllers.

2. The image forming apparatus of claim 1, wherein the plurality of capacitive loads are divided into a plurality of capacitive load groups, and the first and second electrical power wires are individually connected to the other terminal of each of the capacitive loads of the capacitive load groups and charge and discharge the capacitive load groups.

3. The image forming apparatus of claim 1, wherein the charge/discharge controllers comprise a plurality of first switch elements that switch ON and OFF the charging to the capacitive loads and a plurality of second switch elements that switch ON and OFF the discharging from the capacitive loads, and the second drive circuit comprises a plurality of third switch elements that are connected to the first electrical power wire and a plurality of fourth switch elements that are connected to the second electrical power wire, and the second drive circuit controls the switching ON and OFF of the third switch elements in synchronization with the switching ON and OFF of the first switch elements and controls the fourth switch elements in synchronization with the switching ON and OFF of the second switch elements.

4. The image forming apparatus of claim 3, wherein the number of the third switch elements of the second drive circuit is equal to the number of the first switch elements of the first drive circuit, the number of the fourth switch elements of the second drive circuit is equal to the number of the second switch elements of the first drive circuit, and a control signal of the second drive circuit is identical to a control signal of the first drive circuit.

5. The image forming apparatus of claim 3, wherein the second drive circuit further comprises ON resistance adjusting terminals that adjust ON resistances of each of the third switch elements and the fourth switch elements in response to an applied voltage.

6. The image forming apparatus of claim 3, wherein the charge/discharge controllers switch ON and OFF the first switch elements and the second switch elements, due to the input of drive signals of a predetermined drive waveform, which is selected from a plurality of drive waveforms, to the charge/discharge controllers, in response to image data, and the second drive circuit further comprises switching controllers that control the selection and number of the third switch elements that are switched ON and OFF based on the number of the first switch elements that are switched ON simultaneously, and control the selection and number of the fourth switch elements that are switched ON and OFF based on the number of the second switch elements that are switched ON simultaneously.

7. The image forming apparatus of claim 6, wherein the switching controllers use one of the drive waveforms of the plurality of drive waveforms as a reference drive waveform to control the selection and number of the third switch elements that are switched ON and OFF based on the number of the first switch elements that are switched ON simultaneously by the reference drive waveform, and to control the selection and number of the fourth switch elements that are switched ON and OFF based on the number of the second switch elements that are switched ON simultaneously by the reference drive waveform.

8. The image forming apparatus of claim 7, wherein the reference drive waveform is the drive waveform that is inputted most frequently to the charge/discharge controllers.

9. The image forming apparatus of claim 1, wherein the first drive circuit is integrated with, or disposed in proximity to, the plurality of capacitive loads, and the second drive circuit is disposed in a position where it is unaffected by heat generated by the first drive circuit.

10. An image forming apparatus comprising:

a plurality of capacitive load groups that comprise a plurality of capacitive loads, with one terminal of each of the capacitive loads being connected to a common electrode and with each of the capacitive loads being charged/discharged on the basis of image data;

a plurality of first drive circuits, each of which comprises a plurality of charge/discharge controllers that are individually connected to another terminal of each of the capacitive loads of the capacitive load groups and individually control the charging and discharging of the capacitive load groups and first and second electrical power wires that are connected to the charge/discharge controllers and charge and discharge the capacitive load groups via the charge/discharge controllers; and a second drive circuit that is connected to each of the first and second electrical power wires and adjusts charge resistance and discharge resistance in response to control of the charge/discharge controllers of the first drive circuits.

* * * * *